Sept. 12, 1933.  W. G. CHRISTOPHERSON  1,926,263
CONNECTER AND METHOD OF ATTACHING THE SAME
Filed April 9, 1930

INVENTOR
William G. Christopherson
BY
ATTORNEY

Patented Sept. 12, 1933

1,926,263

UNITED STATES PATENT OFFICE 1,926,263

CONNECTER AND METHOD OF ATTACHING THE SAME

William G. Christopherson, Grosse Pointe Park, Mich., assignor to Morgan & Wright, Detroit, Mich., a corporation of Michigan Application April 9, 1930. Serial No. 442,816

7 Claims. (Cl. 154—14)

My invention relates to connecters and methods of attaching the same and more particularly to metallic connecters secured to bodies of resilient material and methods of attaching the same. One example of the application of my invention is in securing stems in openings in bodies of resilient materials, such as rubber. In securing metallic connecters to many thermoplastic and/or yieldable substances, difficulty has been experienced in securing a tight joint between the material and the connecter due to the tendency of the material to flow when subjected to a clamping pressure.

I provide a connecter and method of attaching the same such that a metallic connecter may be embedded in thermoplastic and/or yieldable substances, such as rubber and maintain a high resistance against leakage substantially by the application of pressure. The construction provides an efficient means for replacing worn or leaky connecters. The construction is particularly useful in connection with curing bags which are subjected to rough usage and require a fluid tight joint between the material of the bag and the connecter. The present invention is closely related to my application Serial No. 441,267, filed April 3, 1930.

The accompanying drawing illustrates a present preferred embodiment of the invention and method of making the same, in which Figure 1 is a sectional perspective view of a form and layers of material illustrating a step in the method of assembling the connecter;

Figure 3:
Fig. 3 is a perspective view of an anchoring element.
Figure 4:
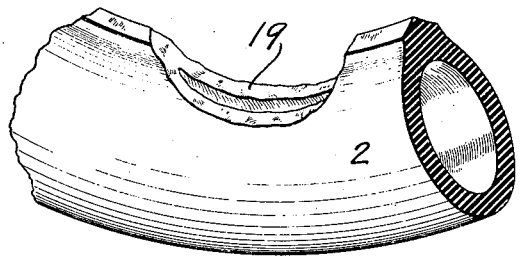
Fig. 4 is a perspective view of a portion of a curing bag preparatory to receiving a connecter.

Referring to the drawing, a metallic connecter 1 for insertion in a body of thermoplastic and/or resilient material, such as a rubber curing bag 2, is prepared by assembling it in a pad 3 of layers 4 of material which are mergeable with the body of the bag 2 as by a vulcanizing operation. Anchoring elements 5 are embedded in certain of the layers 4 so that upon vulcanization of the pad 3 the anchoring layers are interposed between portions of a substantially homogeneous body of material which unites or merges with the stock of the curing bag 2 or other material to which the connecter bag is applied. The anchoring elements 5 are preferably in the shape of washers, as shown in Fig. 3, of a material which retains its shape and density during a treating operation, such as vulcanizing.

Spiral rolls of rubberized fabric are suitable for the anchoring elements. The anchoring elements may be externally coated with rubber or other suitable cement, if desired, and such coating may also be applied between the convolutions of the spiral. An opening 6 at the center of each anchoring element is sufficiently large to pass over the threads of a connecter.

Figures 1, 2:
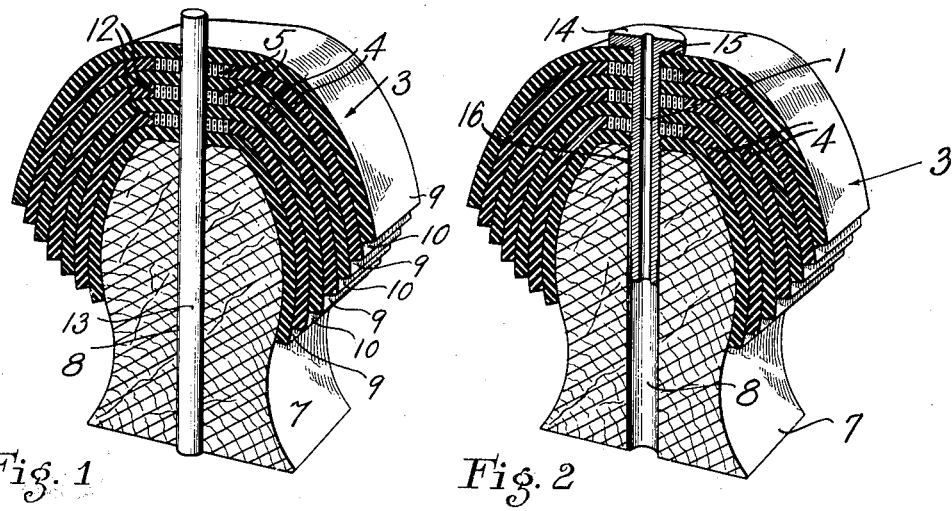
Fig. 2 is a view similar to Fig. 1 showing a metallic connecter partially secured to the bonding material.

In preparing the connecter pad, a form 7 somewhat suggestive of a gear tooth is provided with a central opening 8. Successive layers 9 and 10 of material which will merge with the body to which the connecter is to be attached are piled on the form 7 and caused to assume a cupped shape. The layers 10 are provided with openings 12 in which the anchoring elements 5 are seated. A guide rod 13 extends through the openings 6 in the anchoring elements and through the layers 9 for positioning them, as illustrated in Fig. 1.

When a sufficient number of the layers 9 and 10 have been applied to the form 7, the guide rod 13 is removed and a connecter 1 is driven downwardly into the openings previously occupied by the guide rod 8. The upper or outer end of the connecter 1 terminates in a flange 14 having teeth 15 for engaging the adjacent layer 9. Threads 16 on the connecter extend beyond the layers of the pad so that when the pad and connecter are removed from the form a nut 17 is threaded onto the thread 16 for clamping the pad and anchoring layers. The nut 17 may also be provided with teeth 18 for engaging the adjacent layer of material. The teeth 15 and 18 serve to maintain a fluid tight joint between the material of the pad and the connecter.

In practice I find it desirable to apply gasoline to the opening in the pad before the connecter is positioned, as by the application of gasoline the connecter may more easily be driven in place.

Figure 6:
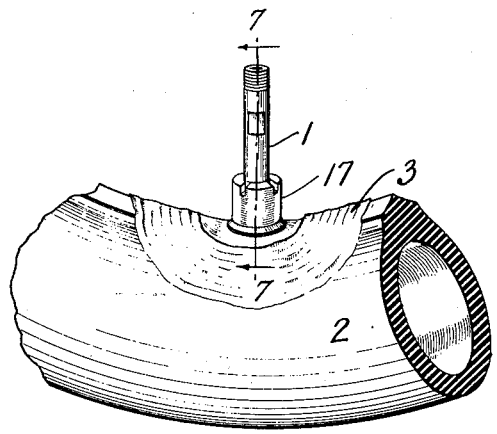
Fig. 6 is a similar view showing the connecter applied to the bag.
Figure 7:
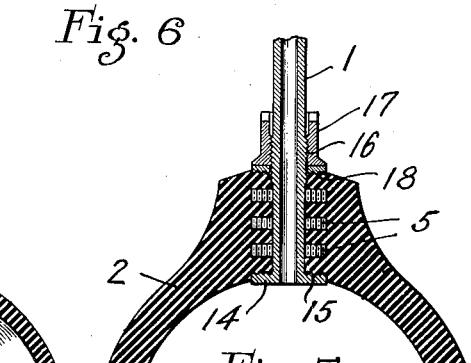
Fig. 7 is a broken cross sectional view of a portion of the bag and connecter taken substantially along the line 7—7 of Fig. 6.
Figure 5:
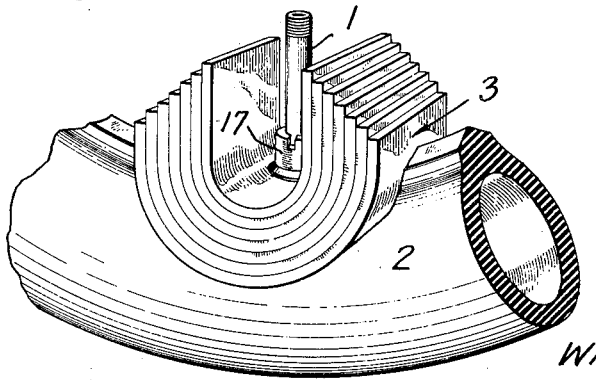
Fig. 5 is a view similar to Fig 4 showing the first step in the application of the connecter.

The curing bag 2 is provided with a concave seat 19 as shown in Fig. 3. The assembled pad is disposed in the seat 19 and by reason of the convex outer surface of the pad it fits into the seat 19 formed in the curing bag. The pad 3 is then trimmed to conform to the general shape of the curing bag 2 after which it is vulcanized in place. The vulcanizing operation causes the material of the layers 9 and 10 to lose its identity and be substantially merged with the material of the bag 2, as shown in Figs. 6 and 7. During the vulcanizing the anchoring elements 5 retain their shape and are embedded in the merged body of the pad and the latter in turn is merged with the wall of the curing bag. With this construction it is not necessary to bond the metal of the connecter 1 to the adjacent material.

With the foregoing construction the seal between the metal of the connecter and the anchoring material does not rely upon a bond therebetween, but relies upon the pressure applied by the nut 17 against the flange 14 as transmitted by the intermediate material. The presence of the anchoring elements 5 prevents the lateral flow of the rubber thereby insuring a seal by the application of pressure. Heretofore difficulty has been experienced in attempting to provide such a seal, as the application of pressure to the opposite sides of the material caused the material to flow away from the connecter and out of the area of pressure.

While I have shown and described the present preferred embodiment of the invention and method of practicing the same, it is to be understood that it may be otherwise embodied and practiced within the spirit of the invention and the scope of the appended claims.

Having thus described my invention, what I claim and desire to protect by Letters Patent is:

1. In the method of attaching a connecter to a curing bag, the steps consisting in forming an arcuate seat in a curing bag and securing an assembled connecter and anchoring pad in the seat by causing some of the material of the anchoring pad to merge with the material of the bag.

2. In the method of attaching a connecter to a curing bag, the steps consisting in forming an arcuate seat along the inner periphery of a curing bag and securing an assembled connecter and anchoring pad in the seat by causing some of the material of the anchoring pad to merge with the material of the bag.

3. In the method of attaching a connecter to a curing bag, the steps consisting in forming a seat along the inner periphery of a curing bag and securing an assembled connecter and anchoring pad in the seat by causing some of the material of the anchoring pad to merge with the material of the bag.

4. In the method of attaching a connecter to a curing bag, the steps consisting in forming a seat in a curing bag, placing in the seat a pad comprising a connecter, anchoring elements and material mergeable with the stock of the bag, trimming the pad, and securing the pad in place.

5. In the method of attaching a connecter to a curing bag, the steps consisting in forming a seat in a curing bag, placing in the seat a pad comprising a connecter, anchoring elements and material mergeable with the stock of the bag, trimming the pad, and vulcanizing the pad to the bag.

6. In the method of attaching a connecter to a curing bag, the steps consisting in forming an arcuate seat along the inner periphery of a bag, preparing an arcuately shaped anchoring pad about a connecter with the connecter projecting inwardly of the pad, shaping the pad, and securing the pad in said seat whereby the connecter projects radially inwardly of the bag.

7. In the method of making a curing bag, the steps consisting in assembling a plurality of layers of material and anchoring elements into a convex shape, forming a concave seat along the inner periphery of a curing bag, fitting the said layers to said seat, and securing the said layers in said seat by causing some of the material of some of the layers to merge with the material of the bag.

WILLIAM G. CHRISTOPHERSON.